Figure 3:
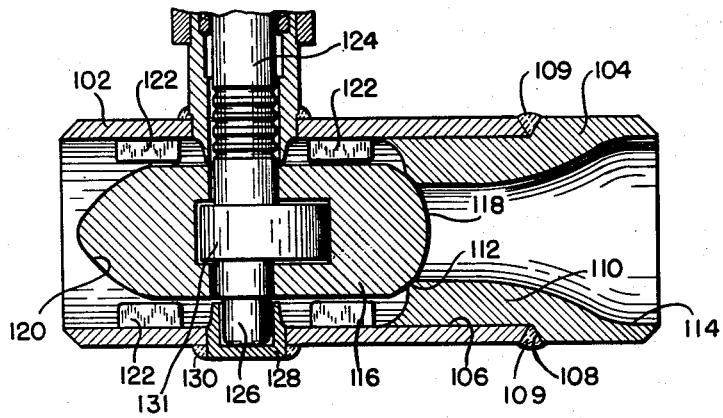

May 12, 1942.　　　J. D. MATTIMORE　　　2,283,076
VALVE
Filed Oct. 1, 1940　　　2 Sheets-Sheet 1
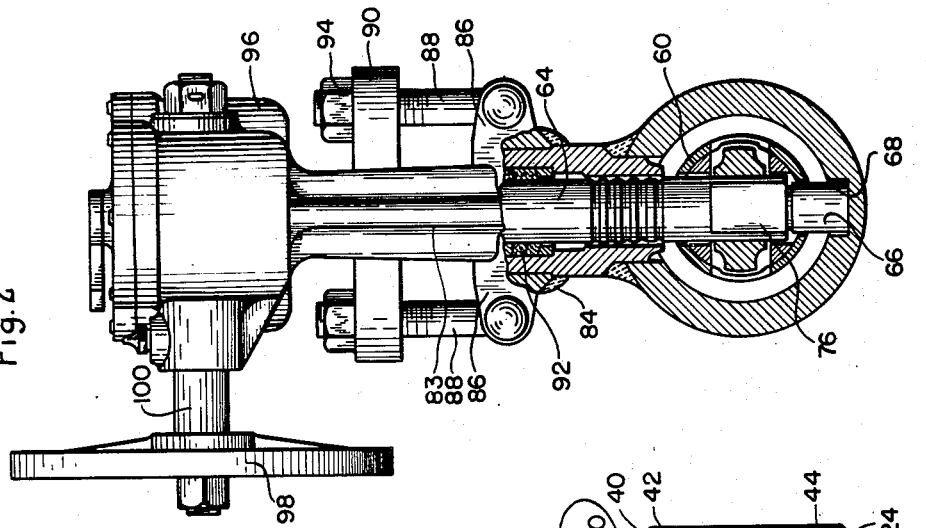
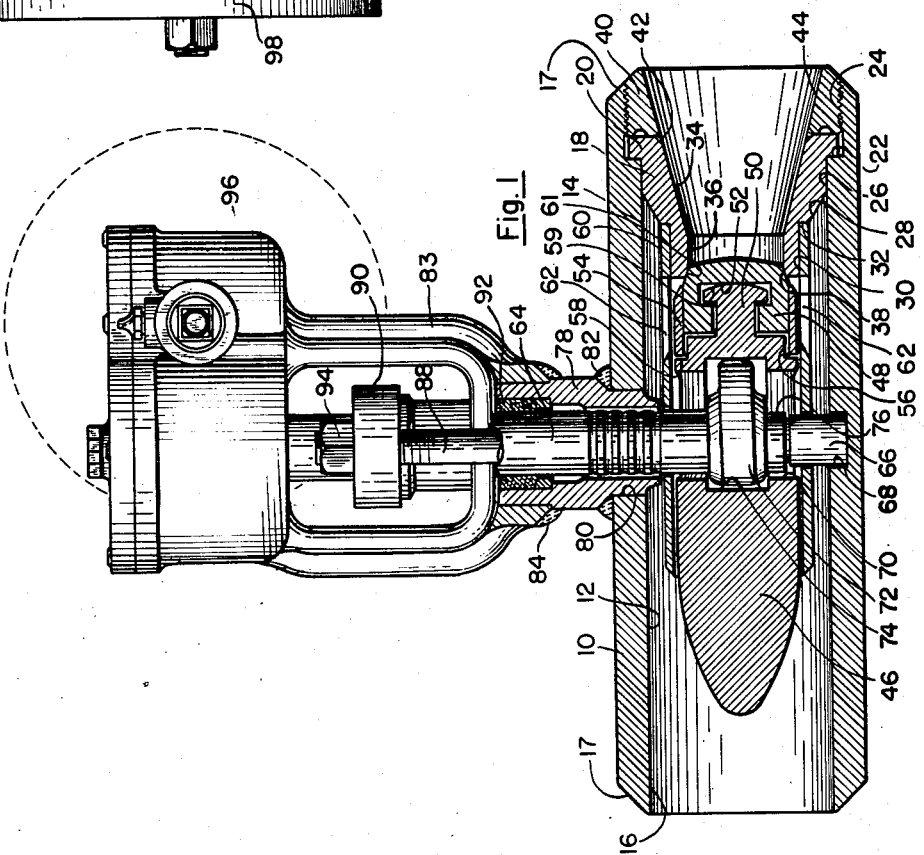
INVENTOR.
John D. Mattimore
BY Albert J. Henderson
ATTORNEY.

Patented May 12, 1942

2,283,076

UNITED STATES PATENT OFFICE 2,283,076

VALVE

John D. Mattimore, Greensburg, Pa., assignor to Walworth Patents Inc., Boston, Mass., a corporation of Massachusetts Application October 1, 1940, Serial No. 359,217

8 Claims. (Cl. 251—40)

This invention relates to valves and more particularly to wrought metal valves of welded construction.

Wrought metal valves, such as globe and gate valves, made largely by welding the parts together, have been proposed to overcome various deficiencies of those with parts joined together by means of bolts or threads. Considerable improvement in prevention of leakage has resulted from these welded constructions. The design of such valves has, however, followed closely upon that of standard gate and globe valves which were originally constructed of cast metal parts. The cost of shaping the wrought parts composing welded valves of conventional design and of the extensive welding required to fabricate the structure has impeded the development of such valves. Moreover, the greater percentage of welded valves which have been utilized have been designed for low pressure conditions in which steel valves are required mainly for resistance to stresses and shocks imposed by means external to the piping. Such conditions are encountered by valves used in naval vessels, for example.

It is thus evident that little consideration has heretofore been given to welded valves for service under the severe conditions imposed by high pressures and high temperatures jointly encountered. The heavy sections involved and the difficulties of producing pressure-tight welds for such service conditions have discouraged previous attempts to develop welded valves of conventional type for these conditions. Nevertheless, in the field of high-pressure, high-temperature steam power plant piping a demand has always existed for improved valves utilizing developments in welding technique.

Conventional cast gate valves have been offered for these services and the expedient of replacing all bolted joints with welded joints has been tried. While tendency to leakage and weight have thus been reduced, the incentive for further examination of the subject still exists in view of requirements for lighter and less costly structures. An added spur is the demand for similar reduction in weight and bulk of these valve structures which are proposed for even more severe service conditions in the process of development.

Coincidentally, with the developments in this field there is an even stronger demand in the field of marine power piping for lighter valve structures for high-pressure, high-temperature conditions which are for the first time being extensively used for marine propulsion. In stationary power plant practice excessive weight involves more initial cost and more expensive supports, but in marine power plants excessive valve weight also reduces the useful load which can be carried by the vessel.

Hence, in view of the complicated mode of fabrication required, and the insufficient weight reduction which resulted from attempts to utilize standard casting forms in wrought metal welded valve constructions, such designs were not followed in seeking a solution to the problem hereinbefore described. It was felt that a departure from the customary gate and globe type valve might lend itself more readily to the contemplated fusion welding technique and provide the simplicity of construction, together with the reduction in weight, which was sought. It is, therefore, one of the objects of this invention to provide a wrought metal valve construction particularly adapted for fabrication by welding the parts together.

Another object of the invention is to reduce the weight of the valve to a minimum.

Another object of the invention is to avoid the use of complicated and unnecessarily massive conformations.

Another object of the invention is to reduce pressure drop through the valve and avoid turbulence and eddy currents in the valve passages.

Another object of the invention is to prevent distortion of the valve seat and associated parts due to the use of welded connections.

Another object of the invention is to eliminate all possible sources of leakage by avoiding the use of separable metallic joints.

Another object of the invention is to provide support for the pipes in which the valve is secured without causing distortion of the valve seat.

Figure 4:
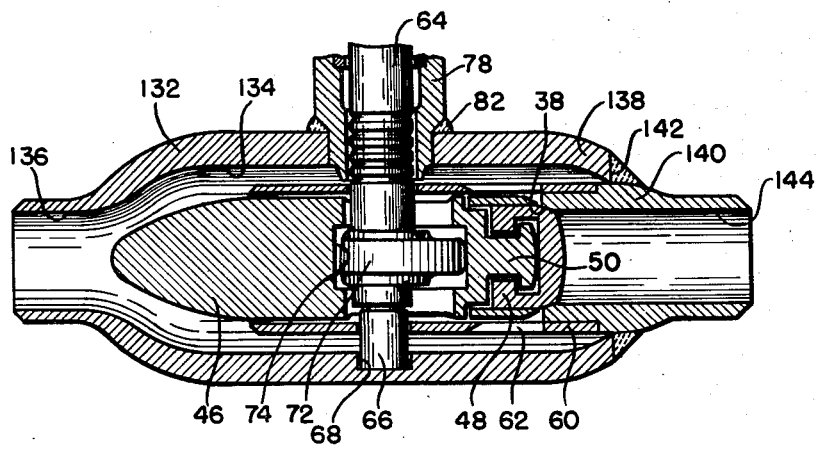

Other objects of the invention will become apparent from the following description taken in connection with the accompanying drawings wherein:

Fig. 1 is a front elevation, partly in longitudinal section, of a valve embodying the invention, Fig. 2 is an end elevation, partly in longitudinal section, of the valve shown in Fig. 1, Fig. 3 is a partial longitudinal sectional view of a modified form of valve, and Fig. 4 is a partial longitudinal sectional view of a further modified form of valve.

Referring more particularly to the drawings, the valve shown in Figs. 1 and 2 includes a tubular body portion 10 preferably formed of wrought metal having a smooth bore 12 providing an inlet opening 14 at one end of the body and an outlet opening 16 at the other. The portion of the bore lying between the inlet and outlet openings defines a flow passage through the valve and the exterior surfaces at the ends may be beveled as at 17 for connecting pipe sections thereto. It will be understood that these ends may be provided with threads or flanges should such well-known type of connection be desired. The inlet opening 14 is provided with a valve seat member 18 of tubular form and having a head 20 at the outer end engaging with the shoulder 22 of a threaded counter-bore 24 formed in the inlet opening 14. The valve seat member 18 is guided in the bore 12 by a portion 26 extending from the head 20 and closely engaging the wall of the bore.

Extending inwardly from the portion 26 of the valve seat is a tapered portion 28 terminating in a reduced end 30 defining a shoulder 32. The bore of the valve seat 18 has a tapered portion 34 converging inwardly from adjacent the head 20 to form a junction with the throat portion 36 of the valve seat member. A tapered valve seat 38 may be formed on the inner end of the throat portion 36 and surfaced with a suitable hard material if desired. It will be observed that the throat portion 36 has a bore of relatively smaller area than the flow passage through the valve but is substantially concentric therewith. In order to retain the valve seat member 18 in position, a threaded annular retaining member 40 engages with the counterbore 24 and may be secured to the valve seat member 18 by welding, as at 42. Preferably, the bore of the annular member 40 is tapered, as indicated at 44, to form a continuation of the tapered bore 34 of the valve seat member 18.

The valve member, in this embodiment of the invention, comprises chiefly a generally cylindrical tail piece 46 and a head 48. These members may be operatively secured together by the provision of a T-shaped projection 50 on the tail piece 46 which engages with a complemental slot 52 formed in the head 48. The head 48 is smaller in diameter than the tail piece 46 and is adapted to carry a sleeve 54 closely engaging therewith and projecting beyond the slotted end to overlie a reduced portion 56 of the tail piece which defines a shoulder 58 thereon. The general purpose of this construction is to permit the head 48 to rock about the axis of the tail piece 46 and adapt itself in approximate seating relationship with the valve seat 38. Thus, the surface 59 of the projection 50 which engages with the head 48 when the valve member is being seated may be ball-faced and clearance is provided between the slot and the projection for the same purpose. The valve seat engaging surface 61 of the head 48 may also be faced with hard material.

A guide for the valve member is provided in the form of a sleeve 60 which is press-fitted upon the surface 30 of the valve seat member 18 and projects therefrom into the flow passage through the body. The sleeve 60 is spaced from the wall of the flow passage and has a plurality of slots 62 extending therethrough adjacent the valve seat 38 and forming a passage for fluid from the valve seat to the flow passage.

A valve stem 64 extends transversely through one wall of the body 10 intermediate the ends thereof, and is provided with a bearing end 66 journaled within a socket 68 formed partly through the opposite wall. The tail piece 46 of the valve member through which the stem 64 also extends is provided with an enlarged opening 70 for its reception. A portion of the valve stem within the opening 70 carries an eccentric or cam 72 adapted to engage the walls of an enlargement 74 formed intermediate the ends of opening 70. The eccentric 72 may be secured against rotation on the valve stem 64 by the provision of a flat side 76 on the valve stem engaging with a non-circular opening in the eccentric 72, but other well-known methods may be used.

A tubular valve bonnet 78 may enclose that portion of the valve stem 64 projecting from the valve body 10 and be secured within a bore 80 provided therefor in the valve body. As shown in the drawings, seal welding may be used at the junction 82. A yoke member 83 is carried by the bonnet 78 and is conveniently secured thereto by welding as at 84. The yoke 83 is provided with projections 86 extending from opposite sides thereof and carrying bolts 88 engaging with a suitable packing gland 90. The packing gland is adapted to compress packing 92 around the stem 64 in the usual manner when the pressure is applied to the gland by means of the nuts 94 carried by the bolts 88.

The yoke member 82 terminates in a housing 96 within which the valve operating mechanism is carried in operative engagement with the valve stem 64 which extends therein. A suitable handwheel 98 may be secured on the shaft 100 of the mechanism projecting from the housing 96 and providing means for rotating the valve stem. It will be understood that the valve operating mechanism carried in the housing 96 may be dispensed with and the handwheel 98 placed directly on the valve stem or, alternatively, that the device may be arranged for power operation.

In the modification shown in Fig. 3 the tubular valve body 102 is adapted to receive, at the inlet end, a tubular valve seat member 104 having an exterior diameter substantially equal to the diameter of the body and being provided with a reduced portion 106 projecting into the flow passage. The shoulder 108 formed by the junction of the reduced portion 106 with the valve seat member 104 extends in proximate relation with the end of the valve body and is welded thereto as at 109. The valve seat member 104 is provided with a thickened portion 110 adjacent its inner end and extending into the flow passage to form a valve seat 112 therein. The contour of the thickened portion 110 from the valve seat outwardly is preferably in the form of a gradual curve inducing streamline flow and merging into an entrance portion 114 having substantially the same bore as the pipe section to which the valve body is adapted to be secured.

A valve member 116 is provided which, in this instance, is a one-piece construction having a blunt head portion 118 cooperating with the valve seat 112 and an elongated tail portion 120 extending into the flow passage. The valve member 116 is supported and guided in the flow passage in substantially concentric relation therewith by means of the projection 122 extending from the inner wall of the valve body 102. The valve member 116 may be provided with a valve stem 124 of similar form to that described in general in the previous embodiment. In this instance, however, the bearing portion 126 of the valve stem may be received within a separate socket 128 secured in the wall of the body 102 by welding, as at 130. The operation of the valve member 116 to and from its seat 112 through the medium of the cam or eccentric 131 carried thereon was fully described in connection with the foregoing embodiment and further description at this point is deemed unnecessary. As in the foregoing instance both the seat 112 and the engaging portion 118 may be hard surfaced.

In the embodiment shown in Fig. 4 the valve body 132 is of different form from that described in connection with the foregoing embodiments of the invention. In this instance, the valve body 132 has a flow passage 134 of larger diameter than the bore of the pipe to which the body is adapted to be connected. The outlet end 136 of this body is, however, reduced to substantially the same diameter as the bore of the pipe and is of substantially the same wall thickness as the pipe. The inlet end 138 of the body, in this instance, is reduced to substantially the same diameter as the outside diameter of the pipe. Such inlet 138 receives therein a tubular valve seat member 140 and secured thereto as by welding at 142. The valve seat member in this instance has a bore 144 of substantially the same diameter as the pipe to which it is adapted to be connected so that it is also substantially equal in diameter to the outlet 136.

The valve seat 140 carries a sleeve 60 similar in all respects to the one described in connection with Figs. 1 and 2 of the drawings and to which a similar reference numeral is applied. This sleeve 60 also forms a guide and a support for a valve member of similar construction to that utilized in connection with the preceding embodiment wherefor similar reference numerals have been used to designate the similar parts. As the description of these parts and the valve stem construction would obviously involve mere repetition over what has been stated hereinbefore, further detailed description is deemed unnecessary. It will be understood, however, that the embodiment shown in Fig. 3 as well as that in Fig. 4 may include operating mechanism similar to that described in connection with the embodiment shown in Fig. 1 and that they are equally adapted for manual or power operation.

When the structure shown in Figs. 1 and 2 is connected in a pipe line either by welding or by the other well-known modes previously mentioned, it will be apparent that the valve stem can be rotated to move the eccentric thereon to actuate the valve member toward and away from its seat within the flow passage. The passage from the pipe at the inlet end to that at the outlet end is obstructed to a minimum extent by the valve member and its operating means within the valve body. Consequently, a streamlined flow without undue turbulence or eddy currents results. The change in velocity of the fluid is lessened by the use of the construction and the pressure drop is reduced.

The annular passage around the guide sleeve in the flow passage can be made substantially equal in area to the throat portion of the valve seat. This relation between the annulus and throat areas can be varied as required. In cases where the degree of pressure drop is not important considerable reduction can be made without otherwise detracting from the efficiency of the valve. Hence, the valve presents considerable flexibility to variations in proportion of parts for different services. Particularly does the construction lend itself to fabrication by welding, as will be apparent, thus facilitating a marked reduction in weight over prior constructions.

I claim:

1. A valve, comprising a wrought metal tubular body portion providing an inlet and an outlet at opposite ends and having a flow passage extending uniformly through the body therebetween, a tubular valve seat member projecting into the inlet end of said tubular body and being secured in sealing engagement therewith, the bore of said valve seat being substantially concentric with the flow passage but of reduced area, a rotatable valve stem supported in one side of the wall of said tubular body and projecting transversely across said passage through the opposite side of said wall, a tubular valve bonnet enclosing said stem and having sealing engagement with said wall around the projecting end of said stem, a valve member on said stem having an elongated body of streamlined form in axial alignment with the valve seat, said valve member being spaced from the wall of said tubular body portion for defining an annular flow area in said flow passage beyond the valve seat, a sleeve member projecting from said valve seat around said valve member forming a guide and support therefor, said valve having a port affording communication between said flow area and the bore of said tubular valve seat member, and means operable between said stem and valve member to reciprocate the latter into and out of engagement with the seat along the axis of said flow passage upon rotation of said stem.

2. A valve, comprising a wrought metal tubular body portion providing an inlet and an outlet at opposite ends and having a flow passage extending uniformly through the body therebetween, a tubular valve seat member projecting into the inlet end of said tubular body and being secured in sealing engagement therewith, the bore of said valve seat being substantially concentric with the flow passage but of reduced area, a rotatable valve stem extending transversely across said flow passage and projecting exteriorly through a side wall of said body, a tubular valve bonnet enclosing said stem and having sealing engagement with said side wall, a valve member on said stem, said valve member including a tail piece and a head, said tail piece being loosely mounted on the stem and having driving connection with said head, a sleeve extending from said valve seat around the valve member forming a guide and support therefor, and means operable between said stem and tail piece to reciprocate the head into and out of engagement with the seat along the axis of said flow passage upon rotation of said stem.

3. A valve, comprising a tubular body portion providing an inlet and an outlet at opposite ends and having a flow passage extending uniformly through the body therebetween, a tubular valve seat member projecting into the inlet end of said tubular body, a rotatable valve stem extending transversely across said flow passage and projecting exteriorly through a side wall of said body, a valve tail piece loosely mounted on said stem and having a driving connection thereon, a valve head mounted on said driving connection and being adapted to engage said valve seat, a sleeve projecting from said valve seat member around the valve head and tail piece and being spaced from the wall of said tubular body portion for defining a flow area in said flow passage beyond the valve seat, said sleeve having a port therein affording communication between said flow area and the bore of said tubular valve seat member, and means operable between said stem and tail piece to reciprocate the valve head into and out of engagement with the seat upon rotation of said stem.

4. A valve, comprising a tubular body portion providing an inlet and an outlet at opposite ends and having a flow passage extending uniformly through the body therebetween, a tubular valve seat member projecting into the inlet end of said tubular body, a rotatable valve stem extending transversely across said flow passage and projecting exteriorly through a side wall of said body, a valve tail piece having an aperture therethrough in which said stem is loosely received, a T-shaped projection on the end of said tail piece adjacent said valve seat member, a valve head having a complementary slot for loose engagement with said projection on the tail piece and being adapted to engage said valve seat, a collar extending across the junction between said tail piece and valve head for maintaining engagement therebetween, said tail piece, valve head and collar forming an elongated body of streamlined form within the flow passage, a sleeve member mounted on said valve seat and projecting therefrom around said elongated body forming a guide and support therefor, and a cam element carried by said stem within said aperture in the tail piece and engageable with the wall thereof to reciprocate said valve head into and out of engagement with said valve seat upon rotation of the stem.

5. A valve, comprising a tubular body portion providing an inlet and an outlet at opposite ends and having a flow passage extending uniformly through the body therebetween, a tubular valve seat member projecting into the inlet end of said tubular body, the bore of said valve seat being substantially concentric with the flow passage but of reduced area, a rotatable valve stem extending transversely across said flow passage and projecting exteriorly through a side wall of said body, a valve tail piece loosely mounted on said stem and having a driving connection thereon, a valve head loosely mounted on said tail piece and adapted for engagement with said valve seat, said valve head and tail piece forming an elongated body of streamlined form within the flow passage, a sleeve extending from the valve seat around the valve head and tail piece forming a guide and support therefor, said sleeve being spaced from the wall of said tubular body portion for defining an annular flow area in said flow passage beyond the valve seat, a port in said sleeve affording communication between said flow area and the valve seat bore, and a cam element carried by said stem within the tail piece to reciprocate said valve head into and out of engagement with said valve seat upon rotation of the stem.

6. A valve, comprising a wrought metal tubular body portion having a flow passage of larger diameter than the bore of the pipe to which the body is adapted for connection, said body portion being reduced at one end to form an outlet of substantially the same diameter as the bore of said pipe and at the other end reduced to form a welding connection of substantially the same bore as the outside diameter of said pipe, a tubular valve seat member projecting into the last named end of said body and secured to the welding connection, said valve seat member providing an inlet to said flow passage having a bore substantially equal in diameter to that of the pipe to which it is adapted for connection, the bore of said valve seat being substantially concentric with the flow passage, a rotatable valve stem extending transversely across said flow passage and projecting exteriorly through a side wall of said body, a tubular valve bonnet enclosing said stem and having sealing engagement with said side wall, a valve member on said stem in axial alignment with the valve seat and defining an annular flow area in said flow passage beyond the valve seat, a sleeve extending from said valve seat around the valve member forming a guide and support therefor, said valve having a port affording communication between said flow area and the bore of said tubular valve seat member and means operable between said stem and valve member to reciprocate the latter into and out of engagement with the seat along the axis of said flow passage upon rotation of said stem.

7. A valve, comprising a wrought metal tubular body portion providing an inlet and an outlet at opposite ends and having a flow passage extending uniformly through the body therebetween, a tubular valve seat member projecting into the inlet end of said tubular body, a rotatable valve stem extending transversely across said flow passage and projecting exteriorly through a side wall of said body, a tubular valve bonnet enclosing said stem, a valve member on said stem, an apertured sleeve member carried by said valve seat and projecting into said flow passage forming a guide and support for said valve member, said sleeve member being spaced from the wall of said tubular body for defining an annular flow area in said flow passage beyond the valve seat, and means operable between said stem and valve member to reciprocate the latter into and out of engagement with the seat along the axis of said flow passage upon rotation of said stem.

8. A valve, comprising a body portion providing an inlet and an outlet at opposite ends and having a flow passage extending uniformly through the body therebetween, a valve seat member projecting into the inlet end of said body, a rotatable valve stem extending into said flow passage and projecting exteriorly through a side wall of said body, a valve tail piece loosely mounted on said stem and having a driving connection thereon, a valve head loosely mounted on said driving connection and being adapted to engage said valve seat, a collar extending across the junction of said tail piece and head for maintaining engagement therebetween, and means operable between said stem and tail piece to reciprocate the valve head into and out of engagement with the seat upon operation of said stem.

JOHN D. MATTIMORE.